Sept. 21, 1926.  
O. F. HIPKINS  
TRACTION DEVICE  
Filed Feb. 9, 1924
1,600,588
2 Sheets-Sheet 2
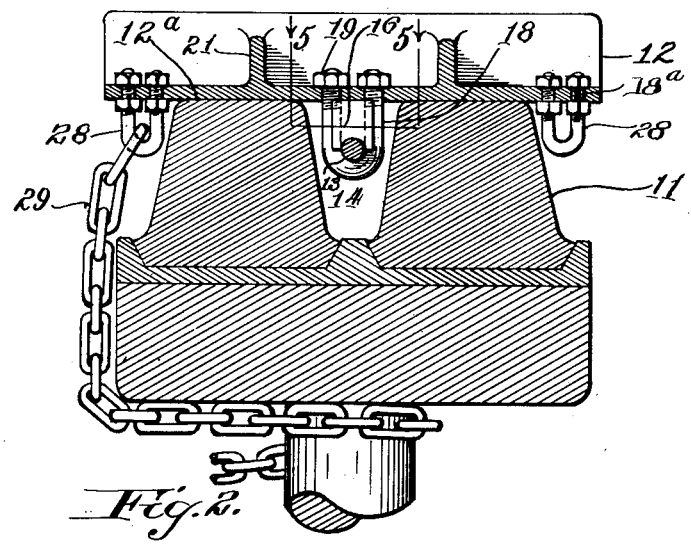
Fig. 2.
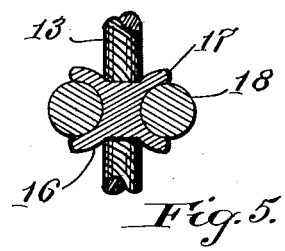
Fig. 5.
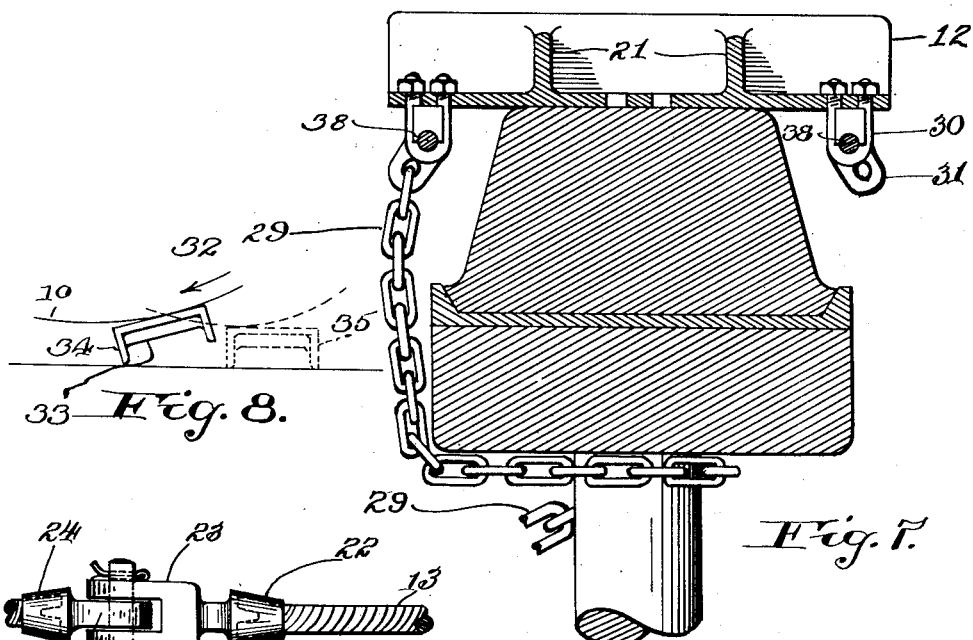
Fig. 8.
Fig. 7.
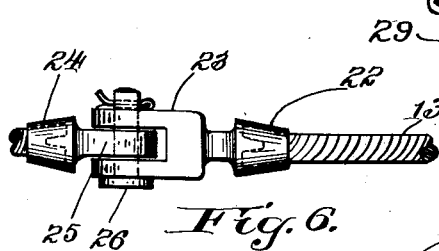
Fig. 6.
Inventor  
Otho F. Hipkins  
By John W. Darley  
Attorney Patented Sept. 21, 1926.

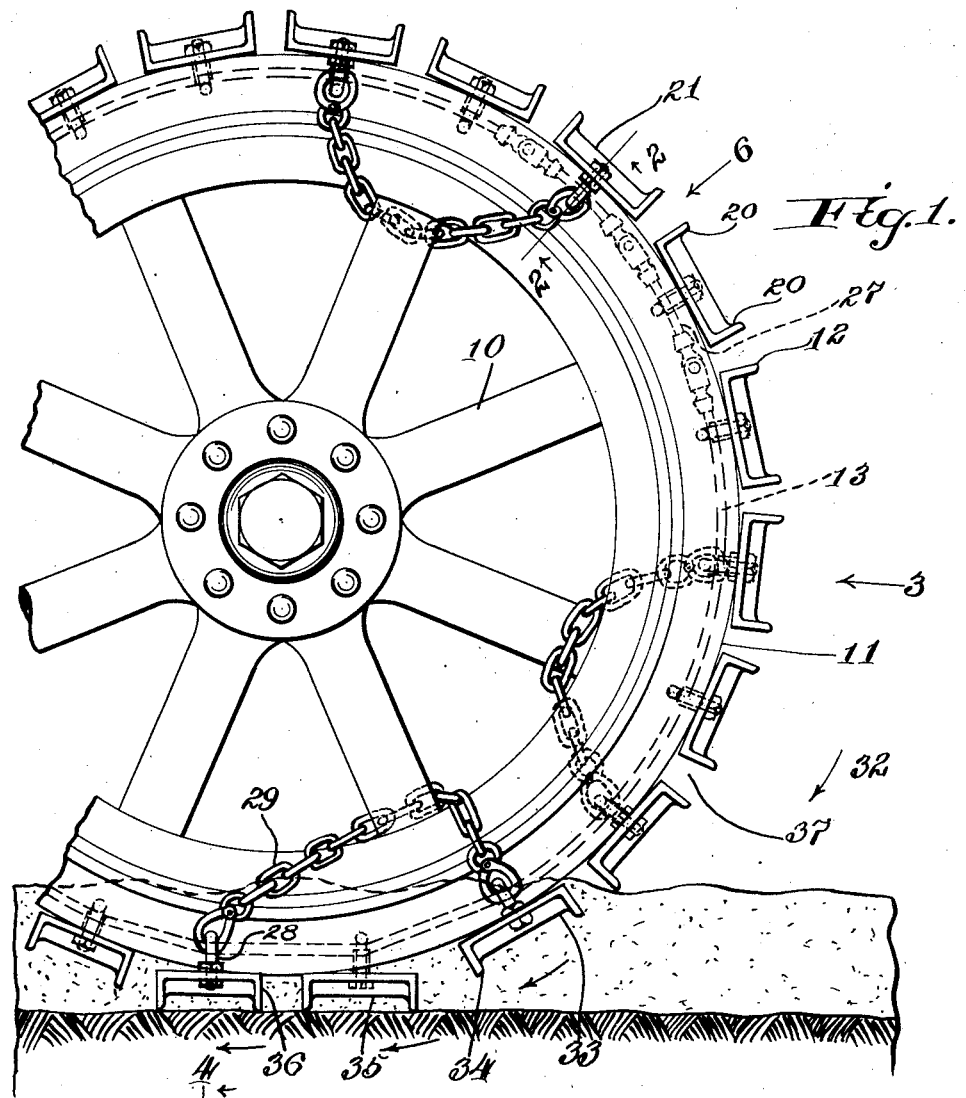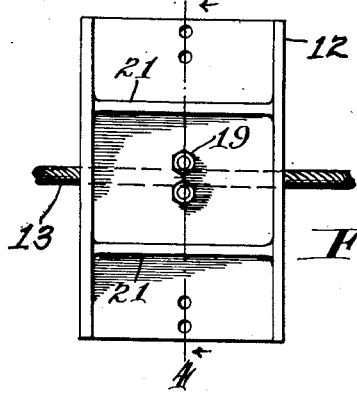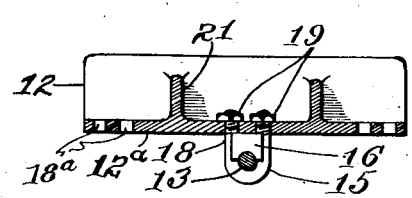

1,600,588

UNITED STATES PATENT OFFICE.

OTHO F. HIPKINS, OF PORT DEPOSIT, MARYLAND, ASSIGNOR OF ONE-HALF TO L. C. HARWARD, OF PORT DEPOSIT, MARYLAND.

TRACTION DEVICE.

Application filed February 9, 1924. Serial No. 691,677.

My invention relates to traction devices.

Among the objects of my invention are:—

To produce a device for vehicle wheels that will increase the tractive effort of said wheels.

To produce a traction device for vehicle wheels so constructed and arranged that the largest possible portion of said device is always in contact with the ground.

To produce a traction device for vehicle wheels that can be used on wheels provided with either single or double treads.

To produce a traction device for vehicle wheels so constructed and arranged that it can be used on wheels of different diameters.

To produce a traction device for vehicle wheels that will not injure the treads of said wheels.

These and further objects of my invention will be set forth in the accompanying specification, reference being had to the drawings, and the novel means by which said objects are effectuated will be definitely pointed out in the claims.

In the drawings:—

Figure 1 is a view of a portion of a wheel provided with a double tread and equipped with my improved traction device.

Fig. 2 is a section along the line 2—2 in Fig. 1 looking in the direction of the arrows.

Fig. 3 is a view looking in the direction of the arrow 3 in Fig. 1, the shoe 12 being rotated through an angle of 90° for purposes of illustration.

Fig. 4 is a section along the line 4—4 in Fig. 3 looking in the direction of the arrows.

Fig. 5 is a section along the line 5—5 in Fig. 2 looking in the direction of the arrows.

Fig. 6 is a view of a portion of my device looking in the direction of the arrow 6 in Fig. 1.

Fig. 7 is a view similar to Fig. 2 but showing my improved traction device applied to a wheel provided with a single tread.

Fig. 8 is a view of parts hereinafter described.

In the drawings:—

10 represents a vehicle wheel provided with a double tread 11. A plurality of shoes such as 12 is arranged around the periphery of said tread, each of said shoes being secured to a cable 13 located within a groove 14 between said treads, said cable being gripped between a U-shaped clamp 15 and a block 16 interposed between said clamp and the under surface $12^a$ of the shoe 12.

The block 16 is provided with ears such as 17 which embrace both legs 18 of the clamp 15, said block being thus retained in position. The legs 18 of the clamp 15 pass through holes $18^a$ provided in the shoe 12 and are locked by nuts such as 19.

Each shoe 12 is shaped in the form of a channel iron which extends transversely across the periphery of the tread 11 and the flanges of said shoe are joined by ribs 21—21 for strengthening purposes and, in addition, serve to prevent side skidding.

The cable 13 is loosely mounted in the groove 14, thereby permitting a certain freedom of action for each shoe. This construction, together with the relatively small diameter of the legs 18 of the clamp 15 with reference to the width of the shoe 12, insures that each shoe will have a rocking movement with reference to the tread 11 for a purpose hereinafter explained.

One end of the cable 13 is secured within a socket 22 which is provided with a clevis 23 and the other end of said cable is secured in a socket 24 which is provided with an eye 25, said eye being mounted within said clevis and secured thereto by means of the pin 26.

The cable 13 may be continuous in length and joined only at its ends as shown in Fig. 6, or it may be provided with any desired number of segments 27 as shown in Fig. 1, whereby any shoe or plurality of shoes may be detached from my traction device in order to permit its application to wheels of smaller diameter. In a similar way, by the addition of the required number of shoes, my traction device may be adapted to wheels of larger diameter.

In order to lock my traction device with reference to the wheel, I preferably employ a plurality of chains such as 29, each of said chains being looped around a spoke of the wheel 10 and the ends of alternate chains being secured to clamps such as 28 mounted in the shoes 12 on the same side of said wheel. By this locking means, I insure that when the wheel begins to rotate, the traction device will commence rotation without any undue strain being exerted on the chains 29. Any desired number of chains may be used.

It will be seen by reference to Fig. 7 that my traction device is capable of ready application to a single tread wheel also by merely removing the clamp from the central portion of the shoes 12 and mounting in the ends of said shoes a form of clamp such as 30 which is provided with an eye 31 for the reception of the locking chains. In this form of adaptation, two cables 38—38 are necessary, one on each side of the wheel, as shown in Fig. 7.

The operation of my improved traction device is as follows:—

Assume that the wheel 10 is rotating in the direction of the arrow 32 and that the lower portion of said wheel has sunk below the surface of the ground as shown in Fig. 1. Then when the shoe 33 reaches a position in its revolution where the flange 34 thereof contacts with a solid portion of the ground; i. e., where the shoe begins to receive its share of the load, said shoe will be rotated, as the wheel 10 moves along the ground, in a clockwise direction about its point of juncture with the cable 13 until it assumes the position, approximately parallel to the surface of the ground, shown by the shoe 35 in Figs. 1 and 8. This action is shown diagrammatically in Fig. 8, in which the full lines represent the wheel and the shoe at the beginning of said action, and the dotted lines represent the same elements after the shoe has been rotated into contact with the ground.

Theoretically, the weight of the superstructure acts along an imaginary line drawn from the center of the axle to the tangential point of contact with the ground; but actually, due to the flattening of the tread and the physical impossibility of obtaining geometrical contact, there is a considerable area on both sides of the aforementioned imaginary line over which the weight is distributed and it is this feature of which I take advantage in my improved traction device.

Furthermore, it can be seen that the position, approximately parallel to the ground, which any one shoe assumes at a certain distance to the right of an imaginary line of contact of the wheel with the ground, as viewed in Fig. 1, is maintained by the same shoe for an equal distance to the left of said line; and that when the shoe 35 has moved to the position as shown by the shoe 36, then the shoe 33 assumes the position as shown by the shoe 35, so that there are two shoes which are transmitting the weight of the superstructure and serving to increase the tractive effort of the wheel 10. Moreover, those shoes which are below the surface of the ground, but which are not bearing any weight, assist in the traction through a grouser action with the surrounding soil.

The shoes 12 are peculiarly appropriate for tractive purposes, for by their channel iron construction they exercise a claw-like grip on the ground, while the ribs 21—21 prevent side skidding, as hereinbefore set forth.

The rocking movement of the shoes 12 with reference to the tread 11 is made possible by reason of the construction hereinbefore mentioned, namely, the looseness of the cable 13 to the extent that the shoes 12 are not held tightly against said tread and the relation between the diameter of the clamp legs 18 and the width of said shoes. Each shoe 12 is, therefore, secured to the cable 13 by what is substantially a pivoted joint.

If, for any reason, the shoes 12 become filled with mud, traction can still be obtained through the flanges of adjacent shoes and the spaces such as 37 included thereby, for the rocking movement of said shoes serves to remove the mud from said spaces.

It is to be noted that the shoes 12 not only protect the cable 13, but also, because of the broad, flat surface thereof in contact with the tread 11, will not injure said tread.

Thus, it can be seen that my device achieves the utmost traction possible, as hereinbefore set forth, and that such a result is obtained without the slightest injury to the tread, but while I have shown one preferred form of my invention, it is to be understood that the disclosure is for the purpose of illustration only and in nowise to limit my invention to the exact elements and combinations thereof shown, for many changes may be made in same without departing from the spirit of my invention.

I claim:—

1. The combination with a wheel, of an attaching cable loosely mounted adjacent the tread thereof and free throughout its length from the rim of said wheel, a plurality of shoes disposed around said tread and substantially pivotally secured to said cable, said shoes being adapted for a rocking movement relative to said tread, and means for locking said shoes with reference to said wheel comprising a plurality of chains looped around the spokes of said wheel, the ends of each alternate chain being secured to said shoes on the same side of said wheel.

2. The combination with a wheel provided with a double tread, of a cable loosely mounted in the groove between the elements of said tread, a plurality of shoes disposed around said tread, each shoe comprising a channel iron extending transversely across said tread and substantially pivotally secured to said cable, and means for locking said shoes with reference to said wheel.

3. The combination with a wheel provided with a traction device, of means for locking said device with reference to said wheel, comprising a plurality of chains looped around the spokes of said wheel, the ends of each alternate chain being secured to said device on the same side of said wheel.

4. The combination with a wheel provided with a double tread, of a plurality of shoes spaced around said tread, each shoe comprising a channel iron extending transversely across said tread, a clamp secured to said shoe and disposed in the groove between the elements of said tread, a cable loosely mounted in said groove and secured to said shoes by said clamps, and means for locking said shoes relative to said wheel comprising a plurality of chains looped around the spokes of said wheel, the ends of each alternate chain being secured to said shoes on the same side of said wheel.

5. The combination with a wheel, of flexible attaching means loosely mounted adjacent the tread thereof, a plurality of shoes disposed around said tread and substantially pivotally secured to said means, said shoes being adapted for a rocking movement relative to said tread, and means for locking said shoes with reference to said wheel.

6. The combination with a wheel, of attaching means loosely mounted adjacent the tread thereof, and a plurality of shoes disposed around said tread and substantially pivotally secured to said means, said shoes being adapted for a rocking movement relative to said tread.

7. The combination with a wheel, of a cable loosely mounted adjacent the tread thereof and free throughout its length from the rim of said wheel, and a plurality of shoes disposed around said tread and substantially pivotally secured to said cable, said shoes being adapted for a rocking movement relative to said tread.

8. The combination with a wheel, of an attaching cable loosely mounted adjacent the tread thereof, a plurality of shoes disposed around said tread and substantially pivotally secured to said cable, said shoes being adapted for a rocking movement relative to said tread, and means for locking said shoes relative to said wheel comprising a plurality of chains looped around the spokes of said wheel, the ends of each alternate chain being secured to said shoes on the same side of said wheel.

In testimony whereof, I affix my signature.

OTHO F. HIPKINS.